March 5, 1935.  L. R. MASON  1,993,217
REVETMENT STRUCTURE
Original Filed Dec. 19, 1932
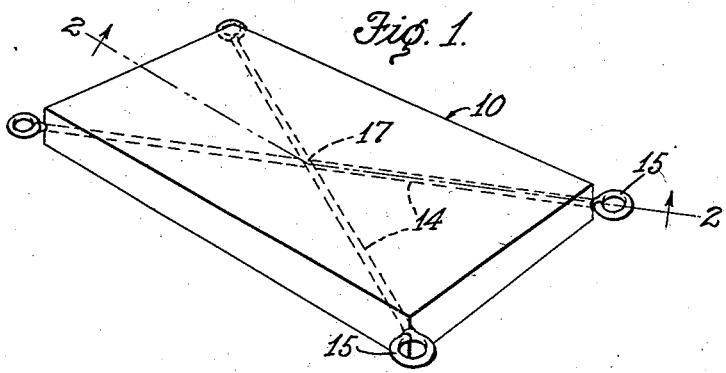
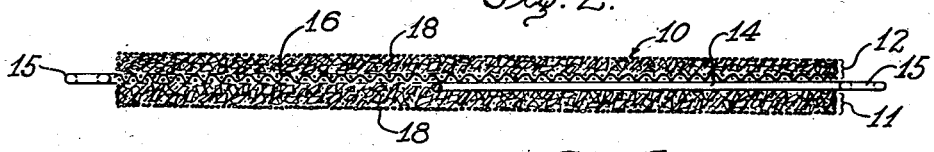
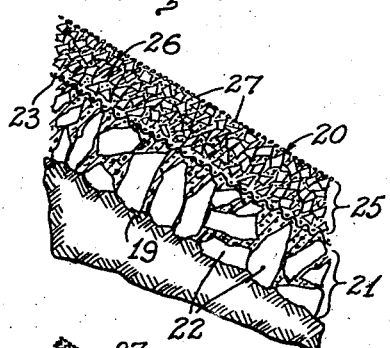
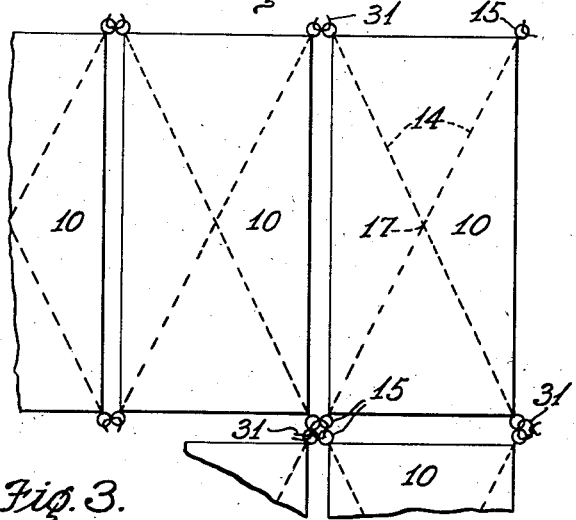
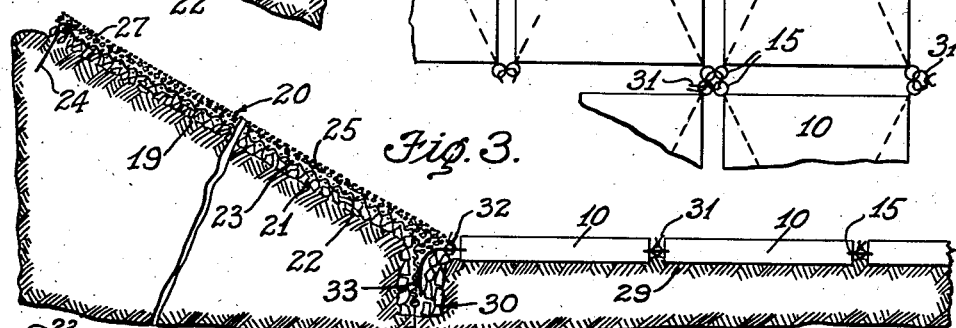
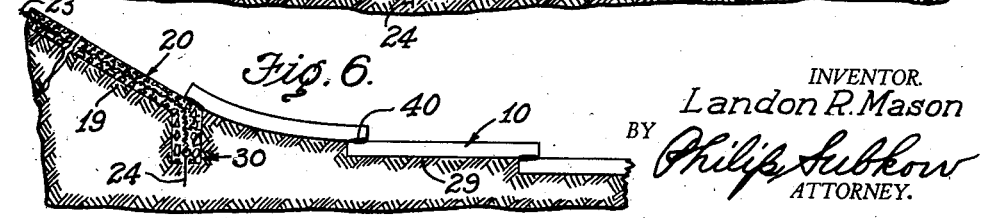
INVENTOR.
Landon R. Mason
BY Philip Subkow
ATTORNEY.

Patented Mar. 5, 1935

1,993,217

UNITED STATES PATENT OFFICE 1,993,217

REVETMENT STRUCTURE

Landon R. Mason, Los Angeles, Calif., assignor to Union Oil Company of California, Los Angeles, Calif., a corporation of California Original application December 19, 1932, Serial No. 647,849. Divided and this application July 1, 1933, Serial No. 678,663

5 Claims. (Cl. 61—37)

The present invention relates to revetments, earth dams, levees and like types of embankment protections and to methods for their construction. In particular, the invention relates to embankment protections containing a bituminous mastic or concrete and to pre-cast reinforced slabs of asphaltic mastic or concrete for lining the surfaces of river banks, ditches and the like, and is a division of my co-pending application Serial No. 647,849, filed Dec. 19, 1932.

Among the types of embankment protections that have been developed for use along the banks of rivers, ditches, levees, etc., is one using a mattress composed of large pre-cast slabs of Portland cement concrete. These slabs are used for all of the sub-aqueous work and to some extent for the work lying in the border zone just above the water's edge when it is at its lowest stage of flow. The upper bank protection is paved with a mat or sheet of Portland cement concrete. Aside from the fact that this type of bank protection is very expensive, it requires constant maintenance due to the destructive action of water in flood times and due to the impacts of floating logs, rolling stones and similar objects which are sufficient in some instances to completely destroy the bank protection of Portland cement concrete. Moreover, the irregularities in the surface of the banks over which the Portland cement concrete slabs are placed, caused either by poor grading or by the washing away of the earth under the mattress of slabs or the monolithic mat, leaves the structure unsupported to such extent that a slight impact will effect cracking and destruction. Another disadvantage to the use of Portland cement concrete is the contracting effect of the concrete after expansion which results in cracking of the structure. Revetments constructed of Portland cement concrete thus require constant supervision, repair and maintenance. In some places, such as along the banks of the lower Mississippi River, large sums of money are spent each year and after each flood to maintain the revetment in repair from the damage caused by floods.

One of the primary objects of my invention is to correct the aforementioned difficulties and disadvantages attending prior revetment construction and to present a revetment which cannot be easily cracked and destroyed.

Another object of this invention resides in a revetment which is self-healing when cracked and one which is sufficiently flexible to follow the contours of the bank which it protects.

Another object of this invention resides in a revetment constructed of an asphaltic mastic or concrete which is tough, dense, flexible and self-healing. Another object resides in a method of constructing revetments employing asphaltic mastic or concrete.

Another object is in a pre-cast revetment slab of great strength which is lower in cost, more simple in construction and of greater durability than any pre-cast revetment slab heretofore used.

It is another object of this invention to present a pre-cast slab adapted to use in revetment construction made of asphaltic mastic or concrete.

Other ancillary objects of my invention will be suggested in the following description taken from the drawing and in the uses to which my invention is put.

Referring to the drawing:

Fig. 1 is a perspective view of a pre-cast slab;

Fig. 2 is a section of the slab taken along line 2—2 of Fig. 1;

Fig. 3 is an end view of a revetment construction shown partially in section;

Fig. 4 is an enlarged view of a portion of the mat on the slope shown in Fig. 3;

Fig. 5 is a partial plan view of the mattress of slabs shown in Fig. 3;

Fig. 6 is an end view of a modified revetment construction.

In its broadest aspects, my invention comprises a revetment containing asphalt, and, in particular, filled asphalt. An important feature of my invention resides in a pre-cast slab containing filled asphalt which may be employed in revetment construction, said filled asphalt being preferably composed of asphalt and a finely communited filler such as diatomaceous earth combined in such proportions as to present a mastic of high tensile strength and resistance to impact and one which is self-healing when fractured.

More specifically, my invention comprises a revetment containing filled asphalt and comprising a mat or sheet containing asphaltic material which is laid on the slope of an embankment to be protected against water action and comprising also a mattress of a plurality of inter-locked pre-cast slabs containing filled asphalt of high tensile strength and impact resistance atached to the embodiment in hinged relation so as to follow the contours of the surface over which it lays.

It is an important feature of my invention to present a revetment comprising filled asphalt and crushed stone or aggregate laid in the shape of a mat or sheet, said filled asphalt comprising a mixture of between 5 and 30% of a filler such as diatomaceous earth and/or rock dust or other suitable filler and approximately 70 to 95% of a "D" grade steam refined asphalt, said filled asphalt having a tensile strength of approximately 300 lbs. per square inch and an impact resistance of upwards of approximately 2.5 ft. lbs. when mixed with Ottawa sand in amounts sufficiently to exactly fill the voids in the sand.

My invention also includes a method of constructing revetments comprising compacting a course of broken stone on an embankment to be protected and filling the voids in the course of broken stone with filled asphalt or asphaltic mastic, then laying a second course of broken stone over the first course and filling the voids in the second course with filled asphalt and preferably reinforcing the revetment with wire fencing or the like laid intermediate the first and second courses.

I have discovered that if banks to be protected are lined with a specially designed bituminous mastic or concrete, the life of the revetment is lengthened considerably due to the great tensile strength, resistance to impact, permanent flexibility and self-healing properties of said bituminous mastic or concrete. I have also discovered that if the pre-cast slabs of Portland cement concrete heretofore employed for revetment construction are replaced with pre-cast slabs of asphaltic concrete or mastic, that a revetment is presented which is more flexible than revetments constructed with the slabs of Portland cement concrete.

The asphaltic concrete which I particularly desire to employ for pre-casting the slabs for use in revetments or for lining river banks and the like comprises a mixture of asphalt, a carefully selected and graded finely comminuted filler or combination of such fillers, graded sand and carefully graded, sharp, crushed stone. The combination of asphalt and the filler shall herein be referred to as filled asphalt or asphaltic mastic and the combination of the filled asphalt with sand and/or crushed rock comprising the aggregate shall be termed asphaltic concrete. I particularly desire to employ filled asphalt rather than pure asphalt for admixture with aggregate to form the asphaltic concrete because filled asphalts possess greater toughness, reasonable high ductilities, high melting points and substantially low penetrations and have very little tendency to become unstable even when mixed with mineral aggregate in extremely high concentrations as I have found necessary in asphaltic concrete for filling the voids in the aggregate.

The filled asphalts which I desire to employ as the cementing agents for the crushed rock or aggregate are described in my co-pending application, Serial No. 647,850, filed December 19, 1932. Briefly, these asphalts may be described as comprising a mixture of "D" grade steam refined asphalt and a filler such as diatomaceous earth or rock dust or a combination of such fillers. A "D" grade asphalt is a steam refined asphalt having a penetration of 40 to 90 at 77° F., a melting or softening point of 110 to 130° F. and a ductility of greater than 100 at 77° F.

The optimum concentrations and character of fillers to be used in building the pre-cast slabs or for lining the bank with monolithic asphaltic concrete or mastic are also described in said co-pending application. The filled asphalt suitable for use in making the slabs and for lining the bank should conform with the following specifications:

Softening point _____175° F or over
Penetration at 77° F_____15 to 45
Penetration at 115° F_____120 or less
Ductility at 77° F_____5 or over
Tensile strength_____ 300 lbs. per. sq. in. or over
Impact resistance_____ 2.5 ft. lbs. or over.

For determining the softening point, penetration and ductility of the filled asphalt, the following methods outlined by the American Society of Testing Materials shall be used:

Softening or melting point, ball
  and ring method_____ D—36—26
Penetration_____ D—5—25
Ductility_____ D—113—26T The tensile strength shall be determined by making one inch cubical briquets in molds commonly used for preparing tensile strength test briquets of Portland cement. The briquets shall be composed of standard 20 to 30 mesh Ottawa sand mixed with the proper quantity of asphaltic mastic to exactly fill the voids in the Ottawa sand which comprises 32½% by volume. After the briquets have cooled they shall be placed for one hour or more in a water bath at 77° F. and shall then be pulled apart in a suitable testing machine for determining tensile strengths.

The impact resistance shall be determined by making two inch cubical briquets in molds and the briquets shall be composed of standard 20 to 30 mesh Ottawa sand mixed with the proper quantity of asphaltic mastic to exactly fill the voids in the Ottawa sand which comprise 32½% by volume. After the briquets have cooled, they shall be placed for one hour or more in a water bath at 77° F. and shall be tested by dropping a two inch steel ball weighing 1.175 lbs. upon the cube, allowing the ball first to drop six inches and then progressively increasing the height of fall one inch per blow until destruction of the cube results. The impact resistance may then be calculated by multiplying the height of fall in feet at cube destruction by the weight of the steel ball in pounds, that is, 1.175.

As asphaltic mastic having the above designated characteristics may be produced by hot mixing from 30 to 72% by weight of "D" grade steam refined asphalt and 28 to 70% by weight of filler or combination of fillers, such as diatomaceous earth and rock dust, as determined in my above mentioned co-pending application. For example, a filled asphalt composed of 72% by weight of asphalt and 28% by weight of diatomaceous earth will conform with the above specifications as to softening point, penetration, ductility, tensile strength and impact resistance. Likewise, a mixture of 57% asphalt, 21½% diatomaceous earth and 21½% rock dust and also a mixture of equal parts of asphalt and filler where the filler comprises equal parts of diatomaceous earth and rock dust will have such specifications as indicated above but it will be observed that the ductilities of mixtures containing rock dust are less than when using straight diatomaceous earth. A mixture of 30% asphalt and 70% rock dust will also be within the specifications but the ductility is considerably lower than when using diatomaceous earth alone or in admixture with the rock dust.

The preferred aggregate used for admixture with filled asphalt to produce the asphaltic concrete comprises a mixture of hard, clean, sharp, crushed stone and clean graded sand having the following specifications:

| | Per cent |
|---|---|
| Passing a 200 mesh sieve | 6–8 |
| Passing an 80 mesh sieve | 14–20 |
| Passing a 40 mesh sieve | 26–34 |
| Passing a 10 mesh sieve | 36–44 |
| Passing a 3 mesh sieve | 54–64 |
| Passing a screen with ½ in. circular openings | 78–88 |
| Passing a screen with ¾ in. circular openings | 95–100 |

In admixing filled asphalts with commercial aggregates, care should be taken to adjust the percentage of filled asphalt to exactly fill the voids in the aggregate since the maximum tensile strength and resistance to impact is obtained when the voids are exactly filled with the filled asphalt. The amount of filled asphalt employed will, of course, vary with the percent of voids in the aggregate and the latter may vary from 15 to 25% by volume in dense mixtures. Consequently, approximately 15 to 25% by volume of the filled asphalt must be employed to exactly fill the voids of the remaining 75 to 85% by volume of the aggregate.

It is preferable to choose an aggregate having a maximum density, that is, having a minimum of voids. By carefully proportioning the amount of sand to crushed rock, it is possible to obtain an aggregate having a minimum of voids. I have found that an aggregate composed of crushed rock capable of passing a screen having ¾ inch circular openings and graded sand in the proportion 50.5% to 49.5% by volume, respectively, has a smaller percentage of voids, i. e., approximately 20.5% by volume than any other combination of these materials. Consequently, approximately 20.5% by volume of asphalt will exactly fill the voids of this aggregate to produce an asphaltic concrete of maximum density.

The pre-cast slab 10 of asphaltic concrete or mastic shown in Figs. 1 and 2 are approximately ten feet long, six feet wide and from two to four inches thick. The slab is preferably built in several courses 11 and 12 of asphaltic concrete or mastic and is provided with several rods 14 of steel, iron or other suitable metal which are placed diagonally in the center of the slab as shown. Each rod is preferably provided with rings 15 on each end protruding from the corners of the slab to permit interlocking at the four corners with adjacent similar slabs by means of cables, rings, clips and like fastening devices. The slab is provided with suitable reinforcing 16 extending centrally through the slab.

Pre-cast asphaltic concrete slabs 10 may be constructed according to the following method:

A rectangular steel form of the required dimensions for the slabs, such as to length, width and thickness and similar to the forms used in constructing slabs of Portland cement concrete is placed on a level surface of such material as will prevent sticking of the slab to be constructed to the surface. If desired, the surface may be covered with manila paper in order to prevent bonding of the slab to the surface. Steel or iron rods 14 of about ⅜ inch in diameter provided at each end with rings 15 and somewhat longer than the diagonal length of the form are placed diagonally across the form in such manner as to permit the ends to protrude out of the corners of the form. The rods are placed about half way into the thickness of the form. One way of permitting the rods to be placed half way into the form is to slit the corners of the form to the required depth so as to permit the rods to rest at the corners of the form. If desired, the intersection 17 of the diagonally placed rods may be tied with wire. Asphaltic concrete composed of filled asphalt, graded sand and crushed rock at a temperature of 250° to 450° F. is then poured into the mold and is tamped to exactly fill the mold. After the asphaltic concrete has cooled and hardened sufficiently to permit its removal, the slab is removed from the mold. The asphaltic concrete is preferably prepared by first forming the filled asphalt by mixing asphalt and filler at a temperature of 350 to 500° F. and then mixing the filled asphalt while hot with the aggregate which has also been heated to temperatures approximating that of the asphalt. If desired, approximately 20% by volume of the filled asphalt composed of equal parts by weight of asphalt and filler where the filler comprises equal parts by weight of diatomaceous earth and rock dust may be mixed with approximately 80% by volume of aggregate composed of crushed rock and sand. Preferably, I desire to employ a filled asphalt composed of 28% by weight of diatomaceous earth and 72% asphalt because it is possible to use more asphalt when using diatomaceous earth to produce a filled asphalt of a given high tensile strength and ductility than when using rock dust either alone or in admixture with diatomaceous earth. Moreover, diatomaceous earth absorbs the oils in the asphalt and prevents evaporation of the oils by the sun or atmosphere, thus giving the revetment a longer life than when using coarser fillers alone which do not possess this phenomenon except to a minor degree.

A preferred method for constructing pre-cast asphaltic concrete slabs is as follows:

After placing the form on a suitable surface, as stated previously, a course 11 of one to two inches of crushed stone of such size as to pass a screen of ¾ inch circular openings is placed in the form. The rods 14 are then placed in the form and filled asphalt of the above stated composition, i. e. 50% asphalt, 25% diatomaceous earth and 25% rock dust, is poured or sprayed into the mold at 250 to 450° F. in amounts sufficient to fill the voids in the crushed stone and to completely cover the surface of the crushed stone. A second course 12 of one to two inches of crushed stone is laid over the first course of crushed stone and filled asphalt and hot filled asphalt is again applied as before. Immediately after the second application of filled asphalt, screenings 18, such as gravel, are broomed over the slab and the entire slab is consolidated by tamping or rolling. When the slab has cooled and hardened sufficiently to permit removal, it is removed from the form and is ready for use. If desired, screenings 18 may also be provided for the lower face of the slab by placing them in the mold prior to the building up of the slab.

If desired, and the same is quite preferable, reinforcing 16 is placed between the first and second courses 11 and 12 of crushed rock and filled asphalt is preferably placed on the first course of crushed stone prior to filling the voids with filled asphalt. The reinforcing may consist of any acceptable wire fencing or any other type of inter-woven or fabricated wire or cotton or jute mesh. This is to be placed between the courses of the crushed rock and filled asphalt and should be thoroughly covered with filled asphalt so that it will be bonded to the courses between which it lays. The mesh of the fabric used should large enough to permit the interlocking of the courses between the mesh. If a non-metallic mesh is used, the material should be saturated with asphalt or asphalt containing finely divided mineral filler.

The above described pre-cast slabs are employed in revetment construction known as butt-slab revetments, that is, where the ends of each slab are abutted against adjacent slabs and are held together by means of cables, rings or clips passed through the rings protruding from the corners of the slab. In such cases, the metal rods carrying the loops to permit joinder of adjacent butt-slab revetments are necessary. However, I do not wish to be limited to the exact mode of placing the rods in the slab since the rods may be placed in other directions in the slab than by placing them diagonally across the slab. It is entirely possible to construct revetments of the lap-slab type, that is, where the slabs are laid like shingles on a roof, the lower end of the upper slab overlapping the upper end of the lower slab by approximately one foot. In such cases, the slabs are constructed without the metal rods since the slabs are retained in position by the weight of the over-lapping slabs.

In order to determine some of the characteristics of slabs constructed of my asphaltic concrete, I have made certain tests which show the desirability of using pre-cast slabs of asphaltic concrete for revetments rather than slabs of Portland cement concrete. I have made slabs of asphaltic concrete 27 inches wide, 36 inches long and 2 inches thick in a manner similar to that disclosed above for making slabs for use in revetments. However, the steel rods were omitted but the reinforcing was used. For example, a one inch course of small crushed stone was placed in the form and filled asphalt composed of 72% by weight of "D" grade asphalt and 28% by weight of diatomaceous earth at 450° F. was poured by means of a pouring pot over this course in amounts sufficient to fill the voids in the crushed stone. Wire fencing for reinforcement was placed over this course and then a second one inch course of crushed stone was laid over the reinforcing and first course. Hot filled asphalt was again applied to the crushed stone. Immediately after the second application of asphalt, screenings were broomed over the slab and the entire slab was consolidated with a hand tamp.

Portland cement concrete slabs of exactly the same size as the asphaltic concrete slabs and with the same type of reinforcing mesh wire were prepared. The concrete had a composition by weight of one part Portland cement to four parts of clean, sharp, graded sand which is used by the U. S. Government to line the banks of certain rivers. A concrete of this composition is stronger than concrete containing one part Portland cement, two parts sand and four parts crushed stone. These slabs were cured for seven days under water prior to testing.

After seven days of aging, a slab of Portland cement concrete and a slab of asphaltic concrete were subjected to impacts of a falling hammer weighing ten pounds dropped from a height of three feet. Each of the slabs to be tested were removed from its form and placed on a dry sand bearing three to four inches thick and in such position that when the hammer was allowed to fall, it struck exactly in the center of the slab. The hammer was then struck upon the slab from a height of three feet. On the second blow from three feet, the Portland cement concrete slab cracked through its entire length and was held together merely by the reinforcing. It was completely destroyed a few blows thereafter. The reinforced asphaltic concrete slab was then tested in exactly the same manner after first thoroughly chilling it by cooling it with cold water in order to make the test as drastic as possible and to imitate practical conditions. One hundred blows from a height of three feet produced no fracture whatever and merely beat down a slight depression under the hammer due chiefly to the smashing of the screenings which formed the upper course of the slab.

To illustrate the flexibility of the asphaltic concrete slab, it was placed across a pile of sand so that the slab was supported only at its center. The results of this test showed that although the slab bent to follow the contour of the sand pile, it did not crack. To illustrate the self-healing characteristics, the slab was purposely cracked by a sharp blow and was then placed on a flat surface and in a short course of time, the crack disappeared.

Tensile strength tests performed by pulling apart one inch cubical briquets in the manner stated above and composed of $32\frac{1}{2}\%$ by volume of filled asphalt comprising 28% by weight diatomaceous earth and 72% by weight asphalt and $67\frac{1}{2}\%$ by volume Ottawa sand showed tensile strengths of approximately 400 lbs. per square inch, whereas similar tests on one inch cubical briquets of one part Portland cement and three parts Ottawa sand revealed tensile strengths of merely 210 lbs. per square inch.

It is thus apparent that pre-cast revetment slabs of filled asphaltic concrete are superior to those made of Portland cement concrete with regard to tensile strength, resistance to impact and flexibility. Furthermore, asphaltic concrete slabs are superior with respect to the self-healing property after fracture which, of course, is not apparent in the Portland cement concrete slabs.

An example of the method for constructing a reinforced asphaltic concrete revetment is as follows:—

After the slope of the bank 19 (Fig. 3) is carefully graded to a 1 on 2 to 3 slope, a mat 20 of asphaltic material is placed on the bank. This mat is constructed by spreading a course 21 of broken stone 22 of 1 to 3 inches in thickness over the embankment or slope to the toe of the bank. The stone is then compacted and brought to a proper cross-section. In this construction, the sand forming the smaller aggregate may be omitted, if desired. Reinforcing 23, such as any acceptable type of malleable wire fencing or any fabric such as that used for reinforcing the above described pre-cast slabs, is then tightly and evenly stretched over this course of broken stones. I prefer to employ a mesh of No. 9 gauge wire having the mesh spaced 6 to 12 inches apart. The mesh may be either tied with wire at its joints or it may be spot welded. The wire netting may be anchored by means of pins 24 at both the upper and lower ends of the embankment in order to maintain the reinforcing stretched tightly. Hot asphalt, into which has been thoroughly mixed from 5 to 30% by weight of diatomaceous earth and/or other suitable fillers, such as rock dust, is then applied over the broken stone and reinforcing until all of the voids are filled and the surface is completely coated. Any suitable means, such as pumping, spraying or pouring, may be used for applying the filled asphalt to the course of broken stone and reinforcing wire. The amount of filled asphalt required will vary from one-half to three gallons per square yard depending upon the percentage of voids in the course. The percentage of voids is dependent upon the thickness of the course, size of stone used and other factors. In every case as much asphalt should be used as can be held by the first course and reinforcing without running down the slope.

A second course 25 of broken stone 26 is then spread evenly over the prepared base course and is compacted by tamping or rolling until the bottom of the top course adheres to and is interlocked with the base course and reinforcing. This top course may be from 1 to 2 inches in thickness. A second application of the filled asphalt is then applied similar to the first application and in amounts sufficient to fill all voids between the stones and to cement the top course to the base course. As much of the asphalt is applied to the top course as will hold without running down the slope. This may vary from one-half to three gallons per square yard. A thin layer 27 of screenings, stone dust or sand is then spread over the entire surface and the entire surface is compacted by tamping or rolling.

It will be observed by reference to Fig. 4 that the broken stone 22 employed for the base course may be larger than the broken stone 26 of the top course. For example, the base course may be prepared with broken stone capable of passing circular openings in diameter equal to the thickness of the base course, whereas the crushed stone used for the top course may be of such size as to pass a screen having circular openings of one inch in diameter. If desired, smaller size crushed stone, such as will pass a screen having circular openings of one-half inch diameter may be mixed with the base course of broken stone to fill the voids in the broken stone prior to the application of the filled asphalt. Likewise, sand and/or gravel may be worked into the base course. Gravel and/or sand may also be mixed with the crushed stone of the top course prior to the spraying of the course with filled asphalt.

It is preferable to provide the toe of the slope with a thick wall 30 of about one foot thick of asphaltic concrete extending several feet into the ground. The purpose of this is to prevent water from washing the earth under the asphaltic mat particularly at the toe of the slope.

If desired, and where the slope of the bank to be protected permits, the bank may be lined with a prepared mixture of hot asphaltic concrete in a manner similar to the pavement of roads with asphaltic concrete. In this case, a layer of asphaltic concrete is first applied and tamped and the reinforcing mesh is then stretched over this course. Then a second course of hot asphaltic concrete is applied over the reinforcing mesh and the whole structure is tamped and rolled. The asphaltic concrete employed may comprise a mixture of filled asphalt and aggregate prepared by hot mixing as stated above. The aggregate employed for the lower course may be considerably larger than that used in the asphaltic concrete of the top course but in all cases the amount of filled asphalt used should be sufficient to exactly fill the voids in the aggregate.

The surface 29 below the toe of slope is preferably lined with a mattress of pre-cast slabs 10 of asphaltic concrete made in the manner described above. Each slab is interlocked or fastened to adjacent slabs by means of cables, rings or clips 31 passed through the rings 15 provided on the slabs as shown in plan in Fig. 5. The slabs are preferably laid with their lengths parallel to the bank. The mattress composed of a plurality of slabs interlocked, as stated, is tied to the embankment in hinged relationship by means of cables or wire 32 passed through the rings 15 of the slabs adjacent the toe of the slope and the ring of anchors 33 which are embedded in the asphaltic concrete at the toe of the slope. A mattress of this character is quite flexible and will follow the contour of the surface over which it is laid should the earth under the slab structure be washed away.

If desired, instead of a butt-slab mattress as described above, a lap-slab mattress may be employed for lining the river bed below the toe of the slope. In such cases, the pre-cast slabs 10 are laid in much the same manner as the laying of shingles on a roof and as shown in Fig. 6. An over-lap 40 of approximately one foot is sufficient to retain the slabs in place. When the river bed is dry, it is desirable to cement the overlapping section 40 to the lower slab by means of an asphaltic cement. This type of structure is also quite flexible and should earth thereunder be washed away, it also will follow the contour of the surface.

While the above invention has been described using "D" grade asphalt as the preferred grade of asphalt, it is evident that other grades of asphalt may be employed to produce the filled asphalt for the above mentioned uses. Nor is the invention limited to a filled asphalt as the plastic ingredient or cementing agent since unfilled asphalt, air blown or emulsified asphalt may be used. Furthermore, other bituminous products having more or less cementing characteristics may be employed such as cracked and uncracked petroleum residues, cracked and uncracked coal tar residues, pitch, tar and the like.

The above disclosure is to be taken as merely illustrative of a preferred embodiment of my invention and is not to be considered limiting, since many variations thereof may be made within the scope of the following claims.

I claim:

1. A revetment structure for protecting the slope of an embankment comprising a course of stones laid on the embankment and filled asphalt filling the voids in said course, said filled asphalt comprising 15 to 25 percent by volume of the mixture of filled asphalt and stones in said course.

2. A revetment structure for protecting the slope of an embankment comprising a course of stones laid on the embankment, asphalt filling the voids in said course and a second course of smaller stones laid on said first-mentioned course with filled asphalt filling the voids in said second course, said filled asphalt comprising 15 to 25 percent by volume of the mixture of filled asphalt and stones in said second course.

3. A revetment structure for protecting the slope of an embankment comprising a course of stones laid on the embankment, filled asphalt filling the voids in said course and a second course of smaller stones laid on said first-mentioned course with filled asphalt filling the voids in said second course, said filled asphalt comprising 15 to 25 percent by volume of the mixture of filled asphalt and stones in the courses.

4. A revetment structure for protecting the slope of an embankment comprising a course of stones laid on the embankment, asphalt filling the voids in said course, reinforcing wire laid on said course and a second course of smaller stones laid on said first-mentioned course with filled asphalt filling the voids in said second course, said filled asphalt comprising 15 to 25 percent by volume of the mixture of filled asphalt and stones in said second course.

5. A revetment structure for protecting the slope of an embankment comprising a course of stones laid on the embankment, filled asphalt filling the voids in said course, reinforcing wire laid on said course and a second course of smaller stones laid on said first-mentioned course with filled asphalt filling the voids in said second course, said filled asphalt comprising 15 to 25 percent by volume of the mixture of filled asphalt and stones in said courses.

LANDON R. MASON.